United States Patent
Silver

[11] Patent Number: 5,924,929
[45] Date of Patent: Jul. 20, 1999

[54] FLEXIBLE DRIVE SHAFT AND DRIVE SHAFT AND ROTOR ASSEMBLY

[75] Inventor: Michael Silver, Manchester, United Kingdom

[73] Assignee: Mono Pumps Limited, Manchester, United Kingdom

[21] Appl. No.: 08/853,201

[22] Filed: May 9, 1997

Related U.S. Application Data

[30] Foreign Application Priority Data

Dec. 2, 1996 [GB] United Kingdom .................. 9625065

[51] Int. Cl.$^6$ ...................................................... F16C 1/12
[52] U.S. Cl. ............................................. 464/97; 464/181
[58] Field of Search ................................. 464/51, 97, 147, 464/162, 179, 182, 185, 903; 403/23, 334

[56] References Cited

U.S. PATENT DOCUMENTS

| | | | |
|---|---|---|---|
| 1,922,596 | 8/1933 | Mangold | 464/160 |
| 3,601,429 | 8/1971 | Coski et al. | 403/334 |
| 4,607,971 | 8/1986 | Hartmann et al. | 464/32 |
| 5,085,564 | 2/1992 | Naylor et al. | 464/97 |
| 5,472,073 | 12/1995 | Hay | 464/182 |
| 5,697,847 | 12/1997 | Meyer | 464/160 |

FOREIGN PATENT DOCUMENTS

| | | | |
|---|---|---|---|
| 4024297 | 2/1991 | Germany | 464/178 |
| 1285377 | 8/1972 | United Kingdom . | |
| 1407758 | 9/1975 | United Kingdom . | |
| 1447465 | 8/1976 | United Kingdom . | |
| 2012649 | 8/1979 | United Kingdom . | |
| 2156042 | 10/1985 | United Kingdom . | |
| 2234320 | 1/1991 | United Kingdom . | |
| 2284646 | 6/1995 | United Kingdom . | |

*Primary Examiner*—Eileen Dunn Lillis
*Attorney, Agent, or Firm*—Harness, Dickey & Pierce, P.L.C.

[57] ABSTRACT

A flexible drive shaft for connection to the rotor of a progressive cavity pump or motor, in which the drive shaft 7, provided with a coating 26, is formed of titanium or similar metal. A relatively inexpensive metal flanged head portion is fastened, e.g. by adhesive, to an end portion 12, of the drive shaft, and is bolted to the rotor 10. The structure enables a relatively shorter drive shaft to be used which is capable of transmitting heavy torque.

12 Claims, 1 Drawing Sheet

FLEXIBLE DRIVE SHAFT AND DRIVE SHAFT AND ROTOR ASSEMBLY

BACKGROUND OF THE INVENTION

The present invention relates to a rotor and flexible drive shaft assembly for a progressive cavity pump or motor, and to a flexible drive shaft used in such an assembly.

FIELD OF THE INVENTION

The invention is particularly concerned with a progressive cavity pump or motor having an outer member, usually a stator, which has a female helical gear formation thereon having N starts and a rotor, rotatable within said stator, and having a male helical gear formation of a same pitch, but with N±1 starts.

In former years, the rotor was driven by means of a drive shaft having a universal joint or pinned joint at each end. More recently, however, the rotor has been driven by a flexible drive shaft as taught, for example, in GB-A-1220848; GB-A-1285377; GB-A-1562277; GB-A-2244517; EP-A-399696 and EP-A-657649.

Such a drive arrangement has been very satisfactory. The various patents listed above indicate a number of different ways of connecting the flexible drive shaft to the rotor. Traditionally the drive shaft is formed of a steel, in particular a stainless steel, and is coated with a non-permeable and non-porous layer such as a plastics material thereby to prevent corrosion fatigue and thus greatly enhance the working life of the flexible drive shaft.

Now one disadvantage of the use of a flexible drive shaft is that the length of the whole pump or motor is increased somewhat as compared with that using the conventional universal joint or pin connection.

SUMMARY OF THE INVENTION

According to the present invention, there is provided a flexible drive shaft for connection to the rotor of a progressive cavity pump or motor, said drive shaft having an elongate body of a high strength, high flexibility metal, such as titanium which is preferred, an end portion of said body at each end of the drive shaft, and a flanged head portion fastened to one or each of said end portions, the flanged head portion(s) being formed as separate elements from the elongate body, and being provided with means for securing the head portion to a progressive cavity pump or motor rotor and/or to the drive or driven member connected to the other end of the drive shaft.

Because the titanium or other high strength high flexibility metal is used, the length of the shaft can be significantly shortened. However, titanium, in particular, is very expensive and if the pump is relatively heavy duty, the torque required to turn the rotor is large. For this reason a flange on the end of the drive shaft is necessary to transmit the torque. However, if the drive shaft were made wholly of titanium and machined out of solid titanium stock, it would be prohibitively expensive to machine.

According to the present invention, the flanged head portion is fastened to an end of portion of the drive shaft, this flanged head portion being made as separate elements, thereby reducing the amount of machining necessary. Preferably it is formed of a relatively inexpensive metal such as stainless steel.

The fastening of the flanged head portion to the drive shaft can be effected in a number of different ways. In one preferred construction the fastening is achieved by use of an adhesive, such as that sold under the trade mark LOCTITE. Additionally or alternatively, a cross-pin may be provided to fasten the flanged head portion to the end portion of the drive shaft.

Both of the end portions are of a larger diameter than the elongate body, thereby to provide a better fastening connection. Advantageously the or each flanged head portion is provided with a plurality of holes for the passage of securing bolts.

According to another aspect of the present invention, there is provided a rotor and flexible drive shaft assembly for a progressive cavity pump or motor, comprising a rotor, a flexible drive shaft according to the invention, and a bolt passing through each of the holes and threadedly engaged in a bore in the rotor.

Preferably a protective sleeve is provided to overlie the bolts thereby to prevent corrosion of these bolts.

Advantageously, a radially inwardly extending flange is formed on the inner surface of said sleeve, said annular flange being provided with apertures for the passage of said bolts, and an annular cover is fitted over the drive shaft and engages and is retained against the sleeve, seals being provided between the sleeve and the rotor, between the sleeve and the cover and between the cover and the drive shaft.

BRIEF DESCRIPTION OF THE DRAWINGS

In order that the present invention may more readily be understood, the following description is given, merely by way of example, reference being made to the accompanying drawings in which.

DESCRIPTION OF THE PREFERRED EMBODIMENTS

Figure 1:
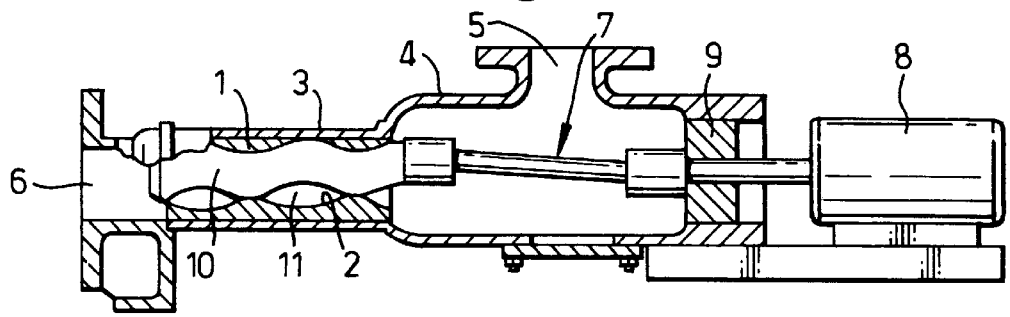
FIG. 1 is a schematic cross-section through a progressive cavity pump of the general type to which the present invention relates.

Referring first to FIG. 1, a stator 1 is provided with a female helical gear formation 2, and is mounted in a barrel 3, connected to a pump housing 4, having an inlet 5. At the left hand of the stator is shown the pump outlet 6. A drive shaft is indicated by the general reference numeral 7, and is driven by an electric motor 8, the outward shaft of which passes through a seal assembly 9. The drive assembly 7, is connected to a rotor 10, having a male helical gear formation. The female helical gear formation has N starts, usually two, starts, and the male helical gear formation has N±1 starts, usually one start. When driven by the motor 8, via the flexible drive shaft assembly 7, the rotor is caused to rotate and to orbit. This is a standard helical gear pump also known as a progressive cavity pump.

Figure 2:
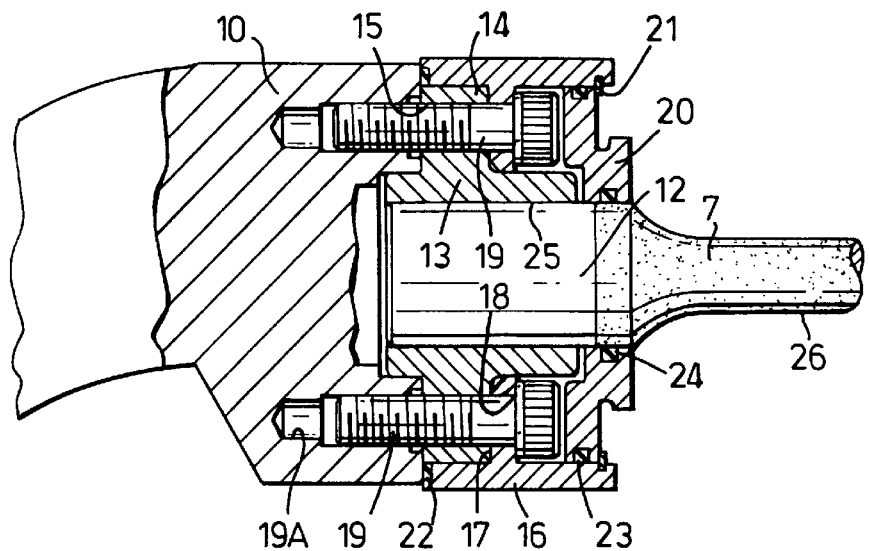
FIG. 2 is an enlarged cross-section showing the connection between he rotor and the flexible drive shaft.

If reference is now made to FIG. 2, the helical drive shaft 7 is made of titanium and has a slightly enlarged end portion 12. Surrounding this end portion 12, is a head portion 13, having a radially outwardly extending flange 14, provided with a plurality of circumferentially spaced holes 15. Surrounding the head portion 13 is an annular cover 16, provided with an annular inwardly extending flange 17, which in turn is provided with an equal number of circumferentially spaced apertures 18.

Bolts 19 are passed through the apertures 18, and holes 15, and are screwed into threaded bores 19A, in the rotor 10.

An annular cover 20 is fitted over the end portion 12, of the drive shaft 7, and is retained in place by a circlip 21. Seals 22,23,24 are provided between the sleeve 16, and the rotor 10, between the sleeve 16, and the cover 20, and between the cover 20, and the end portion 12, of the drive shaft 7, respectively.

In order to fasten the flanged head portion 13, to the enlarged end portion 12, adhesive, such as that sold under the trade mark LOCTITE, is shown at the location 25. It has been found that this adhesive is adequate to fasten the flanged head portion to the drive shaft and to enable it to withstand the necessary rotational forces in use.

The drive shaft 7 is shown as being provided with a plastics material coating 26 which extends just into the enlarged end portion 12, and is engaged by the seal 24.

Figure 3:
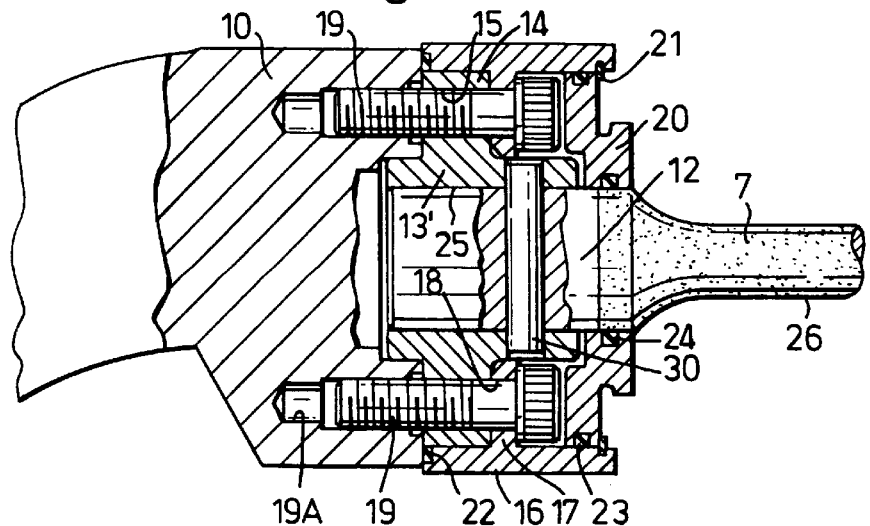
FIG. 3 is a view similar to FIG. 2 of a modified embodiment.

FIG. 3 illustrates a very similar construction and like parts have been indicated by like reference numerals. In the construction, however, a cross-pin 30 is provided to fasten the enlarged portion 12, to the flanged head portion 13'. This pin may be provided alternatively, or additionally, to the adhesive.

Either of the two structures of FIGS. 2 and 3 are robust and are capable of transmitting adequate torque to the rotor. Because titanium is used, the length of the flexible drive shaft is significantly reduced as compared with that of a conventional stainless steel drive shaft.

I claim:

1. A flexible drive shaft for connection to the rotor of a progressive cavity pump or motor, said drive shaft comprising:
   (a) an elongate body of high strength, high flexibility titanium;
   (b) an end portion of said body, at each end of said elongate body;
   (c) a flanged head portion fastened to at least one of said end portions, said flanged head portion(s) being formed as separate element(s) from said elongate body; and being of a different material; and
   (d) means for securing said flange head portion(s) to a progressive cavity pump or motor rotor and/or to the drive or driven member connected to the other end of said drive shaft.

2. A flexible drive shaft as claimed in claim 1, wherein said flanged head portion is formed from a different metal from said elongate body.

3. A flexible drive shaft as claimed in claim 2, wherein said end portion is of larger diameter than the elongate body.

4. A flexible drive shaft as claimed in claim 2, wherein said different metal is stainless steel.

5. A flexible drive shaft as claimed in claim 1, wherein said at least one flanged head portion is fastened to the end portion by adhesive.

6. A flexible drive shaft as claimed in claim 1, wherein said at least one flanged head portion is fastened to said end portion by means of a cross-pin.

7. A flexible drive shaft as claimed in claim 1, wherein said end portion is of larger diameter than said elongate body.

8. A flexible drive shaft as claimed in claim 1, wherein said at least one flanged head portion further comprises a plurality of holes for the passage of securing bolts.

9. A flexible drive shaft as claimed in claim 1, and further comprising a non-permeable non-porous coating on said drive shaft body and wherein said end portion of said body extends beyond said coating.

10. A rotor and flexible drive shaft assembly including a progressive cavity pump or motor comprising a rotor and a flexible drive shaft, said flexible drive shaft comprising:
    (a) an elongate body of high strength, high flexibility titanium;
    (b) an end portion of said body, at each end of said elongate body;
    (c) a flanged head portion fastened to at least one of said end portions, said flanged head portion(s) being formed of separate element(s) from said elongate body and from a different metal from said elongate body; and
    (d) a plurality of holes in said at least one flanged head portion,
    (e) a plurality of threaded bores in said rotor at the same location as said holes in at least one flanged head portion; and
    (f) a bolt passing through each of said holes and threadedly engaged in said threaded bores in said rotor".

11. An assembly as claimed in claim 10, and further comprising a protection sleeve surrounding said bolts.

12. An assembly as claimed in claim 11, and further comprising a radially inwardly extending annular flange formed on the inner surface of said sleeve, apertures in said annular flange, said apertures serving for the passage of said bolts, an annular cover fitted over said drive shaft, means engaging and retaining said cover against said sleeve, and seals located in sealing engagement between said sleeve and said rotor, between said sleeve and said cover, and between said cover and said drive shaft.

* * * * *

UNITED STATES PATENT AND TRADEMARK OFFICE
CERTIFICATE OF CORRECTION

PATENT NO. : 5,924,929

DATED : July 20, 1999

INVENTOR(S) : Michael Silver

It is certified that error appears in the above-identified patent and that said Letters Patent is hereby corrected as shown below:

Column 2, line 37, "he" should be --the--.

Column 2, line 52, after "two" delete ",".

Column 3, line 38, Claim 1, after "body" delete ";".

Column 3, line 40, Claim 1, "for" should be --capable of--.

Column 3, line 40, Claim 1, "flange" should be --flanged--.

Signed and Sealed this

First Day of February, 2000

Attest:

Attesting Officer

Q. TODD DICKINSON

Acting Commissioner of Patents and Trademarks